H. J. STROHBACH.
COFFEE URN.
APPLICATION FILED NOV. 4, 1920.
1,385,593.
Patented July 26, 1921.
3 SHEETS—SHEET 3.
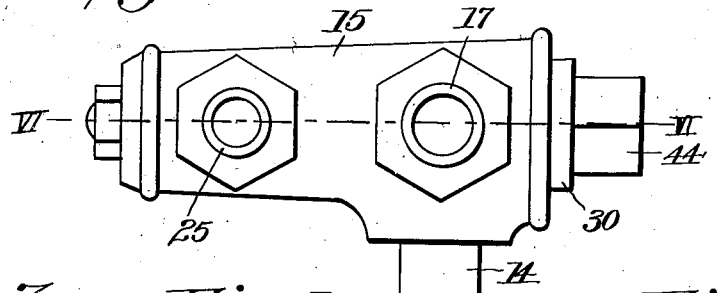
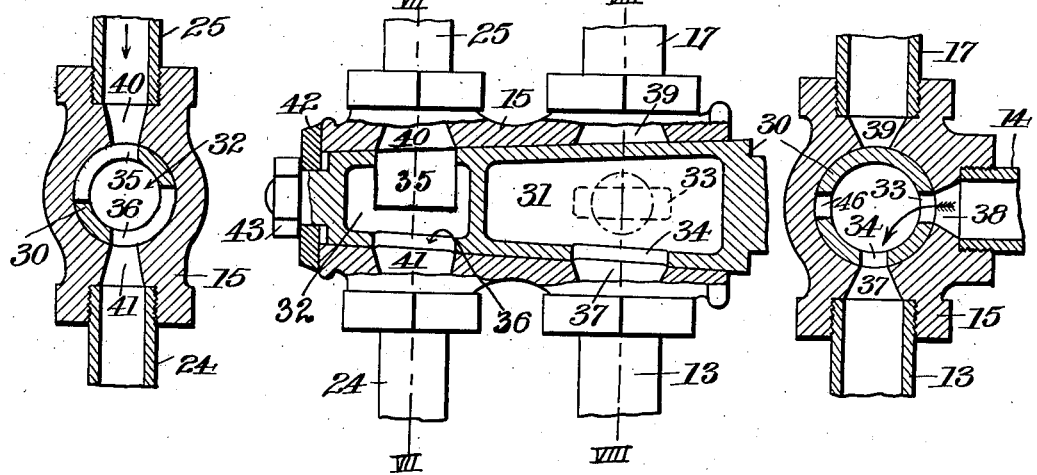
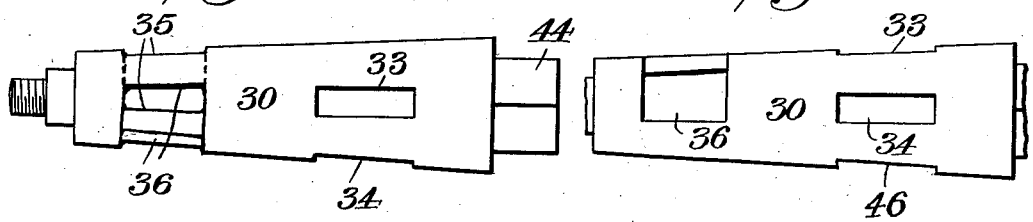
Henry J. Strohbach INVENTOR.
BY
Frederick V. Winters ATTORNEY.

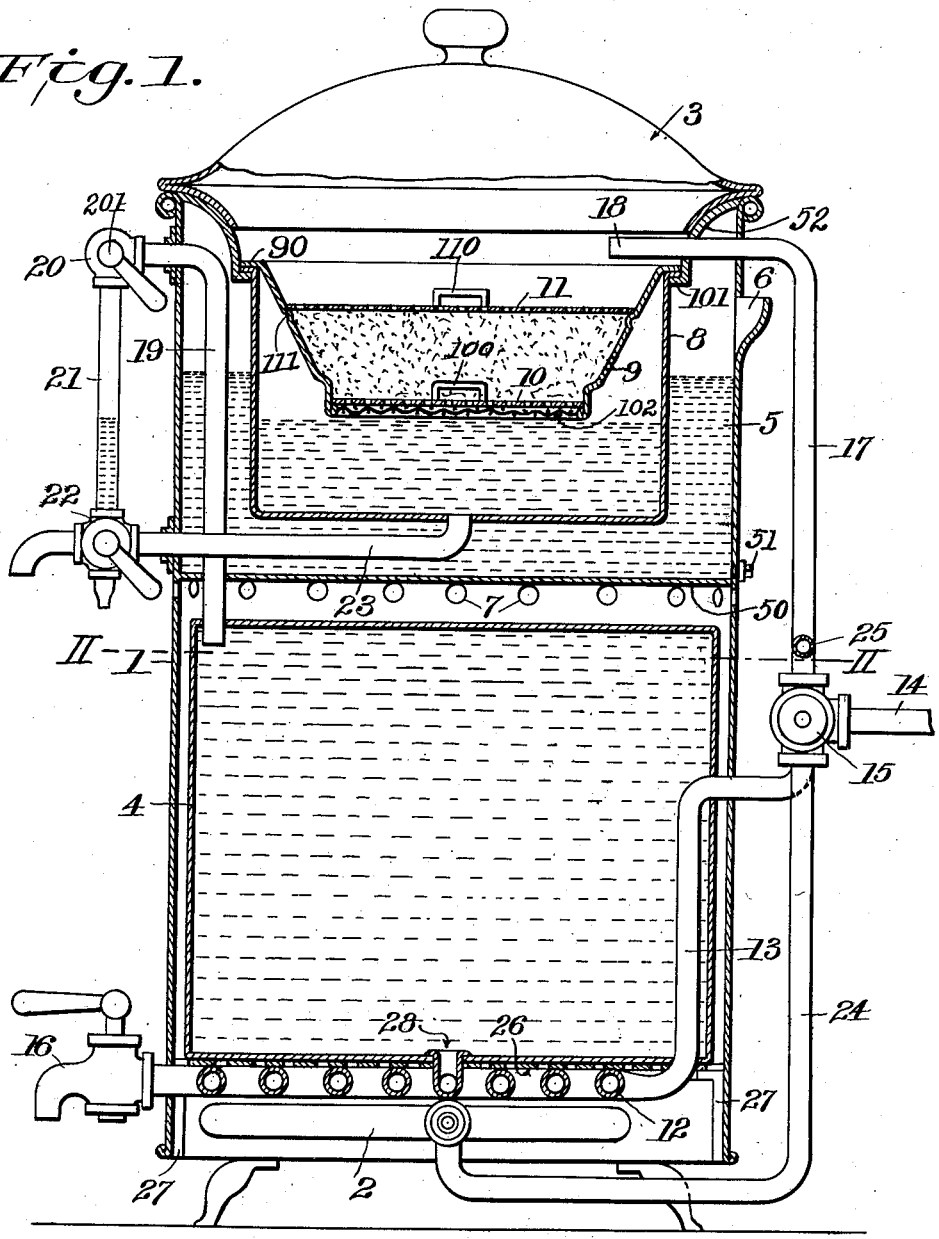

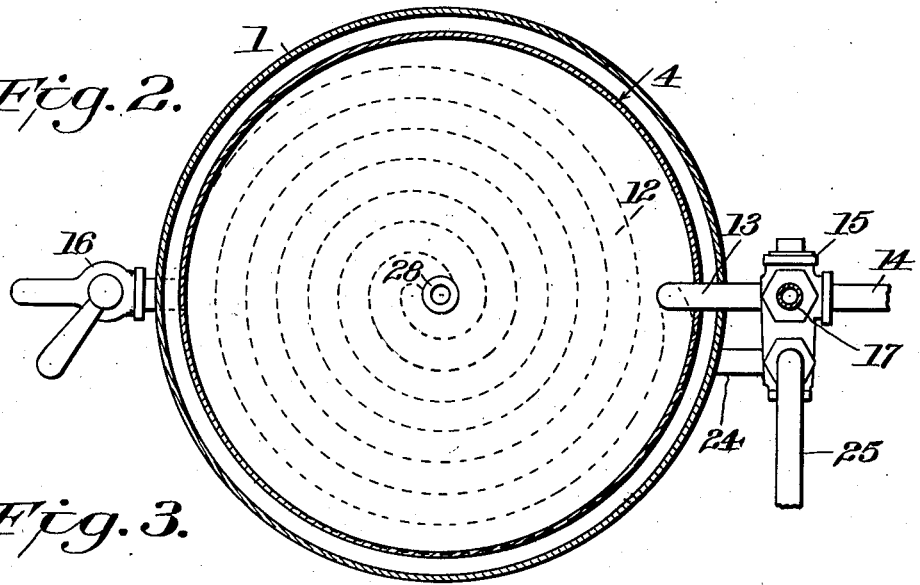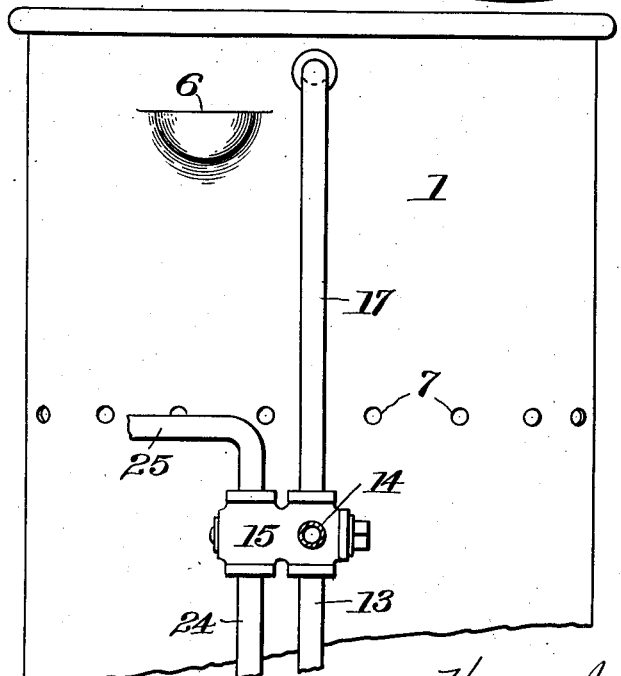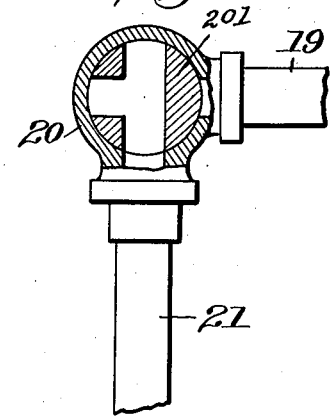

UNITED STATES PATENT OFFICE.

HENRY J. STROHBACH, OF NEW YORK, N. Y.

COFFEE-URN.

1,385,593.   Specification of Letters Patent.   Patented July 26, 1921.

Application filed November 4, 1920. Serial No. 421,624.

*To all whom it may concern:*

Be it known that I, HENRY J. STROHBACH, a citizen of the United States, residing at New York, in the county and State of New York, have invented certain new and useful Improvements in Coffee-Urns, of which the following is a full, clear, and exact specification.

This invention relates to coffee urns and has for its object to provide a device of this kind which is simple in construction and possesses a number of improvements over prior constructions, especially with regard to the heating of the water before contact with the coffee, the supply of said heated water to the coffee percolator, the maintenance of the percolated coffee hot without danger of scorching, and the cleaning of the coffee gage tube or glass.

Another object is to provide improved means for simultaneously controlling the flow of gas to the heater of the urn and the flow of water to the heating chamber and from said heating chamber to the percolator. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is a central vertical section of a coffee urn constructed substantially in accordance with this invention.

Fig. 2 is a horizontal section on the line II—II of Fig. 1.

Fig. 3 is a rear elevation of the upper part of the urn with the cover removed.

Fig. 4 is a detailed sectional view of the valve controlling the supply of water to the upper end of the coffee gage glass for cleaning the same.

Fig. 5 is a detailed plan view of the combination water and gas controlling valve.

Fig. 6 is a section on the line VI—VI of Fig. 5.

Fig. 7 is a section on the line VII—VII of Fig. 6 through the gas controlling portion of the valve.

Fig. 8 is a section on the line VIII—VIII of Fig. 6 through the water controlling portion of the valve, and Figs. 9 and 10 are detailed elevations of said combination water and gas controlling valve looking at the same from the front and below, respectively, as shown in Fig. 6.

As illustrated in Fig. 1, the urn has the usual cylindrical casing 1 fitted with a gas burner 2 below and a removable cover 3 at the top. In the lower part of the casing 1 and spaced from the same is a tank 4 for heating water, said tank being supported on a perforated plate 26 near the bottom of the casing. Above said tank 4 there is an imperforate transverse partition of plate 50 in the casing, forming with the upper portion of the latter a receptacle 5 for holding water which may be introduced therein through a port 6 near the top of the casing and let out when desired via a drain port normally closed by a plug 51.

Around the upper edge of the casing 1 there is an overhanging annular flange 52 having in inner ledge 101 from which a percolator 9 is supported by means of a rim 90 resting upon said ledge. The percolator is arranged in a tank 8 also supported from the ledge 101 and located in the water receptacle 5. The percolator 9 has its lower end closed with muslin or other woven material 102 above which is arranged a perforated plate 10 which may be removed for cleaning by means of a handle 100. Another perforated plate or disk 11 is supported in the percolator 9 some distance above the plate 10 in any suitable manner, as by the shoulder 111 formed in the wall of said percolator. The plate 11 is also provided with a handle 110 for removing the same. The percolator is designed for holding a quantity of ground coffee between the perforated plates 10 and 11, as shown in Fig. 1.

Water is fed to the tank 4 from a supply pipe 14 through the combination water and gas controlling valve 15 and pipe 13 to a coil 12 of pipe arranged below the perforated plate 26 and just above the burner 2, so that the water in passing through said coil to the inlet 28 in the center of the tank 4 is heated before it reaches the tank. The pipe 13 preferably passes through the tank 4, as shown in order that it may be kept hot when the urn is in operation. The coil 12 is provided with a tap 16 for drawing off hot water from the tank 4 when desired. Hot water from the tank 4 may also be conducted to the percolator by means of a pipe 17 connected to the valve 15. Prepared coffee may be drawn off from the receptacle 8 via a pipe 23 controlled by a valve 22, said pipe communicating with a gage glass 21 for indicating the level of the prepared coffee in said receptacle 8. A pipe 19 leads from the top of the tank 4 up through tank 5 and connects with the upper end of the gage glass 21 at the valve casing 20 in which a valve 201 is mounted for admitting water from the tank 4 to the upper end of the gage in order to wash out the same when it becomes discolored from use. The valve 22 at the bottom of the gage is adapted to cut off the pipe 23 while the said gage is being thus cleaned, the cleaning water being discharged through the spout attached to said valve 22. The valves 22 and 201 may both be of the common three-way type shown in Fig. 4.

The valve 15 may be termed a five-way valve as it has three ports for controlling the supply of water and two for controlling the gas which enters via a supply pipe 25 connected to port 40, see Figs. 5 to 10, and passes from said valve via port 41 and pipe 24 leading to the burner 2, as shown in Figs. 1 and 3. The plug 30 of the valve 15 is divided into two chambers 31 for water and 32 for gas, the latter chamber having ports 35 and 36 for placing the ports 40 and 41 of the gas valve into or out of communication. The chamber 31 of the valve plug has three ports 33, 34 and 46 arranged ninety degrees apart so as to place the supply pipe 14 in communication with the pipe 13 leading to the tank 4, as shown in Fig. 8, via ports 33 and 34 in line with ports 38 and 37, respectively, in the valve casing, or so as to place the pipe 13 in communication with pipe 17 leading to the percolator by a clockwise rotation of the valve plug 30 one quarter of a revolution from the position shown in Fig. 8. This rotation of the valve plug will place the ports 33 and 46 in communication with the ports 37 communicating with the pipe 13, and the port 39 leading to the pipe 17, as will be readily understood, the pipe 14 being at the same time cut off. In order that the supply of gas to the burner may not be cut off when the valve plug 30 is adjusted for conducting hot water from the tank 4 to the percolator, as just described, the ports 35 and 36 in the chamber 32 of said plug are made to extend substantially one quarter of the distance around the valve plug, as shown best in Figs. 7 and 9. The gas and water may both be shut off by rotating the valve plug slightly more than a quarter of a revolution, as is evident.

When the urn is in operation and the several tanks and receptacles supplied as shown in Fig. 1, the heat from the burner 2 plays directly upon the water supply coil 12 and bottom of the tank 4 through the perforated plate 26. Some of the heat also passes through said perforated plate around the edge of the bottom of the tank 4 and up through the space between the walls of said tank and the casing and serves to maintain the tank 5 hot, the excess heat and products of combustion escaping from the casing via perforations 7 just below the bottom 50 of said tank 5.

When the water in the tank 4 is heated above the boiling point steam will form in the top of the same sufficient for forcing hot water from the bottom of the tank and up through pipes 13 and 17 to supply the percolator when required. Hot water will also be forced up through the pipe 19 in the same manner for cleaning the gage glass 21 whenever necessary, said pipe 19, extending down into the tank 4 some distance below the top thereof, as shown in Fig. 1 for that purpose.

Having thus described my invention what I claim as new and desire to secure by Letters Patent of the United States is:—

1. In a coffee urn, the combination with a casing, of a water heating tank in the lower portion thereof, a percolator in the upper portion of said casing, a pipe for supplying water to said tank, a valve in said pipe, and a pipe leading from said valve to the percolator for conducting hot water from the tank to the percolator through said latter pipe and part of the water supply pipe, said valve being adapted to place the percolator in communication with the tank or said tank in communication with the water supply.

2. In a coffee urn, the combination with a casing, of a water heating tank therein, a percolator also arranged in the casing and communicating with said tank, a burner for heating the tank, means for supplying water to said tank and fuel to the burner, and means for simultaneously controlling the supply of water to the tank and fuel to the burner.

3. In a coffee urn, the combination with a casing, of a water heating tank therein, a percolator also arranged in the casing, a pipe leading from the tank to the percolator, a valve casing in said pipe, a water supply pipe also communicating with said valve casing, a gas burner below the tank, a pipe for supplying gas to said burner also communicating with said valve casing, and a valve in said valve casing for simultaneously controlling the supply of water and gas to said tank and burner, respectively, and for cutting off the water supply and placing the tank and percolator in communication with each other without cutting off the supply of gas to the burner.

4. In a coffee urn, the combination with a casing, of a water heating tank therein, a percolator also in the casing, a pipe leading from the tank to the percolator, a valve casing in said pipe, a water supply pipe also communicating with said valve casing, a gas burner below the tank, a pipe for supplying gas to said burner also communicating with said valve casing, and a valve in said valve casing for simultaneously controlling the supply of water and gas to said tank and burner, respectively, and for cutting off the water supply and placing the tank and percolator in communication.

5. In a coffee urn, the combination with a casing, of a water heating tank therein, a water receptacle above said tank in the casing, a percolator submerged in said receptacle, means for conducting hot water from the tank to the percolator, means for heating the water in said receptacle, and a pipe for drawing off the contents of the percolator extending through said receptacle.

6. In a coffee urn, the combination with a percolator, of a water heating tank, a pipe for drawing off the contents of the percolator, a gage connected at its lower end to said pipe, and another pipe connected to the upper end of the gage and communicating with said tank for conducting hot water from the latter to said gage for cleaning the same, there being valves at the opposite ends of the gage for controlling the flow of water or the contents of the percolator thereto.

In testimony whereof I have signed my name to this specification.

HENRY J. STROHBACH.